United States Patent [19]

Titus

[11] 4,360,182

[45] Nov. 23, 1982

[54] HIGH-AGILITY REFLECTOR SUPPORT AND DRIVE SYSTEM

[75] Inventor: James W. Titus, Oxon Hill, Md.

[73] Assignee: The United States of America as represented by the Secretary of the Navy, Washington, D.C.

[21] Appl. No.: 163,000

[22] Filed: Jun. 25, 1980

[51] Int. Cl.³ ............................................. A47G 29/00
[52] U.S. Cl. .................................. 248/371; 248/184; 248/654; 343/878
[58] Field of Search ............... 248/371, 393, 184, 550, 248/663, 653, 654, 396; 434/55, 58; 343/878, 880

[56] References Cited

U.S. PATENT DOCUMENTS

| | | | |
|---|---|---|---|
| 1,280,092 | 9/1918 | Shingler | 248/651 X |
| 2,099,857 | 11/1937 | Link | 434/55 |
| 2,524,238 | 10/1950 | Soule | 434/58 X |
| 2,585,579 | 2/1952 | Norden | 343/878 X |
| 2,683,588 | 7/1954 | Gunning | 248/653 X |
| 2,975,993 | 3/1961 | Beagan | 248/654 |
| 3,215,391 | 11/1965 | Storm | 248/184 X |
| 3,481,409 | 12/1969 | Westerlund | 248/654 X |
| 3,527,435 | 9/1970 | Lapp et al. | 248/184 |
| 3,896,885 | 7/1975 | Dahlstrom | 248/654 X |
| 3,967,387 | 7/1976 | Marchegiani | 248/371 X |
| 4,095,770 | 6/1978 | Long | 248/371 |

*Primary Examiner*—J. Franklin Foss
*Attorney, Agent, or Firm*—Robert F. Beers; William T. Ellis; Alan P. Klein

[57] ABSTRACT

An apparatus for mounting a device defining a mounting plane so as to be selectively rotatable about mutually perpendicular axis with respect to a base member defining a base plane. The first axis is defined by a transverse pin fitted to the gimbal and rotatably secured to the base plane. The mounting plane is tilted about either axis by driving an associated, diagonally opposite pair of support arm members linearly so as to foreshorten one support arm member to the extent that the other is lengthened.

8 Claims, 3 Drawing Figures

HIGH-AGILITY REFLECTOR SUPPORT AND DRIVE SYSTEM

BACKGROUND OF THE INVENTION

This invention relates generally to a positioning apparatus, and more particularly to an apparatus for mounting a device defining a mounting plane so as to be selectively rotatable about mutually perpendicular axes with respect to a base member defining a base plane.

In order to position a device such as an antenna, mirror or flat reflector, it must be mounted with two or more axes of rotation (i.e., degrees of freedom). Accordingly, a conventional positioning apparatus has such construction as illustrated in FIG. 1, for example. FIG. 1 shows an antenna positioning apparatus using the common arrangement known as "elevation-over azimuth", also called "train and elevation", wherein a turntable 11 can rotate about an axis 1—1. This axis is vertical in a ground installation, or perpendicular to the deck if used on a ship. Two pedestals 13 and 15 on the turntable 11 support bearings which establish an elevation axis 2—2 orthogonal to the azimuth axis 1—1. (Axis 2—2 may or may not intersect axis 1—1). Antenna 17 is supported by a back-up structure 19 which rotates about axis 2—2. Antenna beam 3—3 is pointed in the desired direction by rotating the back-up structure 19 about the 2—2 axis and the turntable 11 about the 1—1 axis.

The back-up structure 19 is rotated by an electric motor and gear reduction enclosed in one of the pedestals 13. The turntable is rotated by another electric servo motor and gear train enclosed in the pedestal base 21 which is in turn secured to the ground or deck of a ship.

If the antenna 17 must be pointed with extreme accuracy, or if it must be moved with high velocity or rapid acceleration, a relatively wide servo bandwidth is required. This, in turn, demands that the natural frequencies of the structure which can be excited by the drive motor reaction torque must be high. For a given antenna moment of inertia, this implies great structural stiffness, weight, and expense.

There is a "pyramid effect" inherent in the design of any system analogous to FIG. 1. The second (elevation) axis drive requires massive pedestals 13 and 15 together with a correspondingly stiff and massive turntable 11 to obtain the required stiffness for its functioning. The first (azimth) axis drive must then not only accelerate the antenna, but it must also accelerate the elevation drive system and the structure above. Thus, in cases where high accelerations are required, the actual antenna may be only a secondary part of the load on the azimuth drive system.

SUMMARY OF THE INVENTION

Accordingly, it is an object of the present invention to provide a high-agility positioning apparatus.

Another object is to decrease the moment of inertia of a positioning apparatus.

A further object is to increase the resonant frequency of a positioning apparatus.

Yet another object is to reduce the strength and stiffness required for a device mounted on a positioning apparatus.

The objects of the present invention are achieved by an apparatus for mounting a device defining a mounting plane so as to be selectively rotatable about mutually perpendicular axes with respect to a base member defining a base plane. The first axis is defined by a gimbal rotatably secured to the mounting plane, and the second axis is defined by a transverse pin fitted to the gimbal and rotatably secured to the base plane. The mounting plane is tilted about either axis by driving an associated, diagonally opposite pair of support arm members linearly so as to foreshorten one support arm member to the extent that the other is lengthened.

Since only the mounting plane, mounted device, and the support arm members contribute to the moment of inertia of the apparatus about both axes of rotation, the moment of inertia is quite small. Therefore the disclosed apparatus can be rapidly accelerated and positioned.

Further, a high resonant frequency is obtainable because of the direct load path to the base plane, and the inherently low inertia.

The mounted device, such as a reflector for example, can be built with less strength and stiffness for a given high acceleration application because the drive forces act at a relatively long radius, which may be chosen to minimize inertia and thus attain high accelerations.

Additional advantages and features will become apparent as the subject invention becomes better understood by reference to the following detailed description when considered in conjunction with the accompanying drawings wherein:

DETAILED DESCRIPTION OF THE PREFERRED EMBODIMENT

Figure 1:
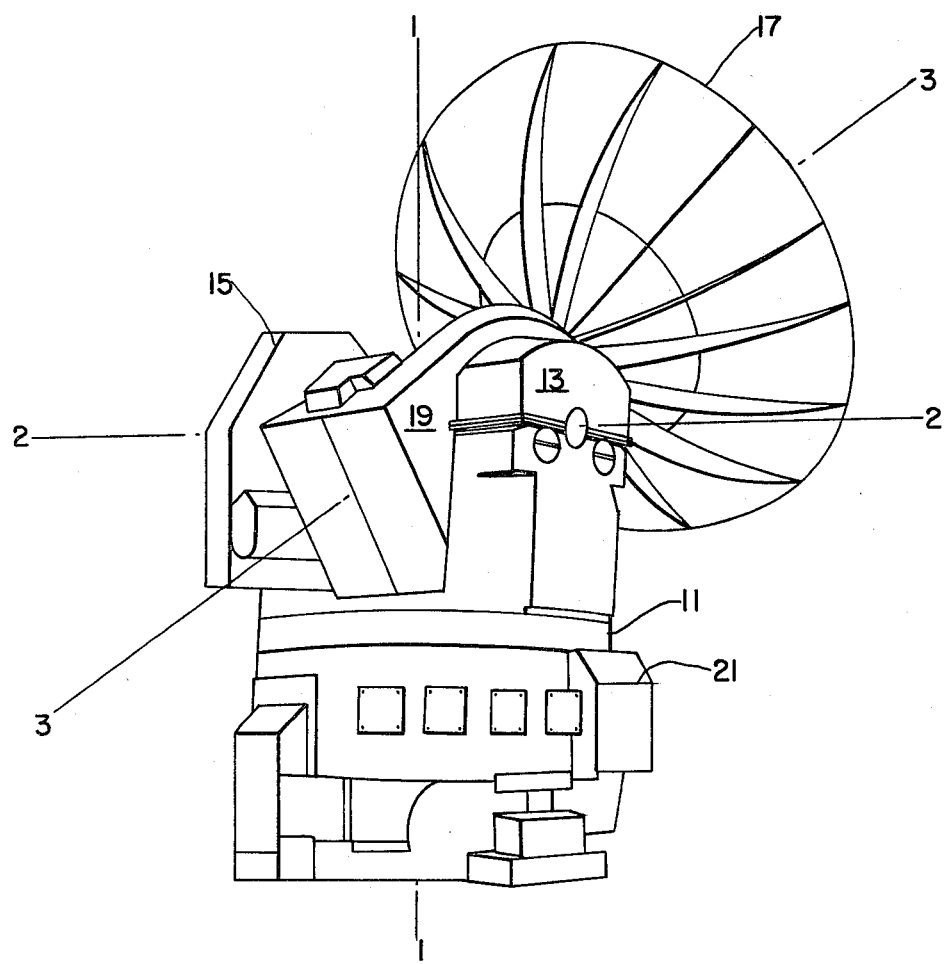
FIG. 1 is a perspective view illustrating a conventional positioning apparatus.
Figure 2:
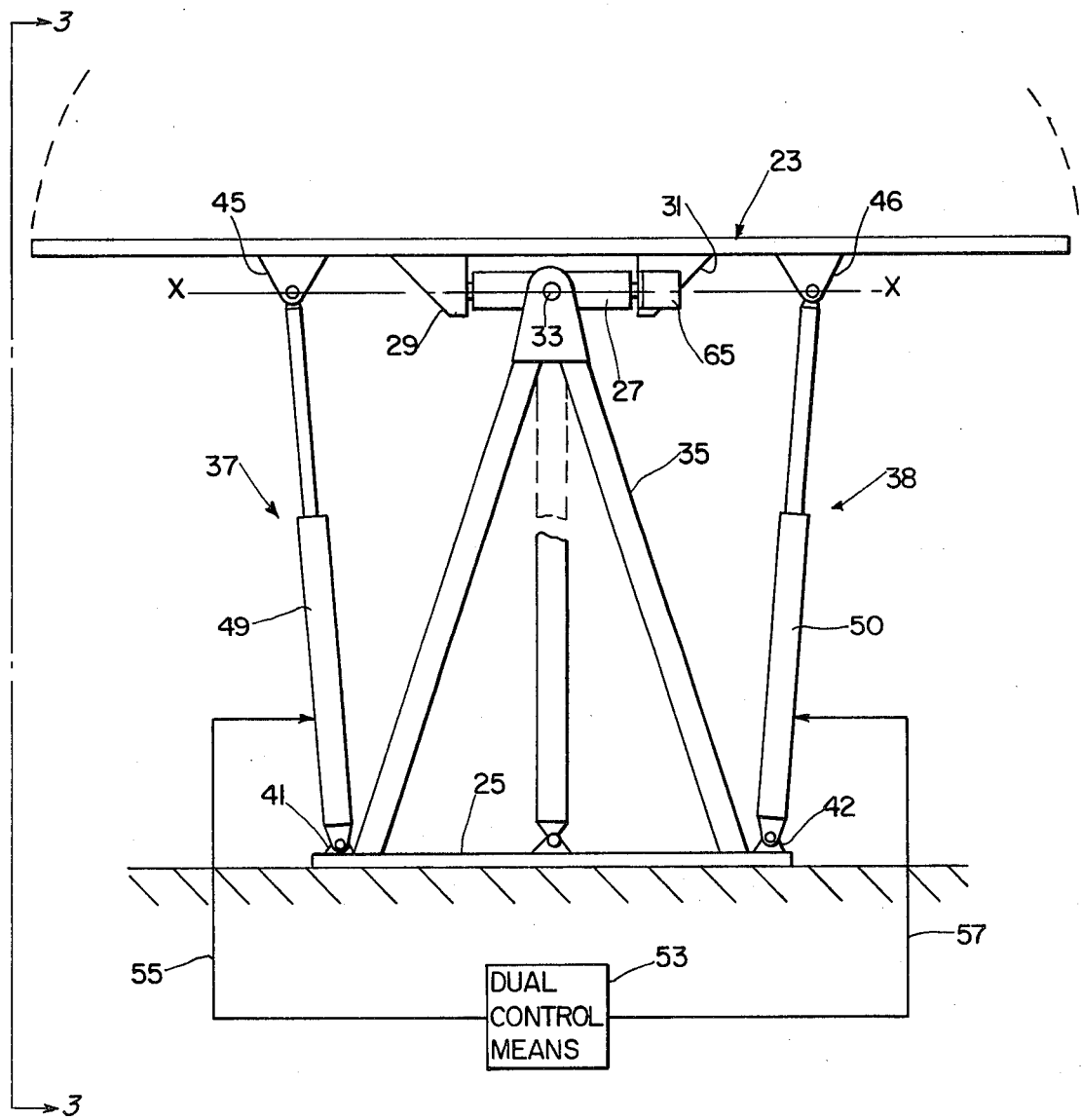
FIGS. 2 and 3 are side and end views, respectively, of the positioning apparatus of the present invention.
Figure 3:
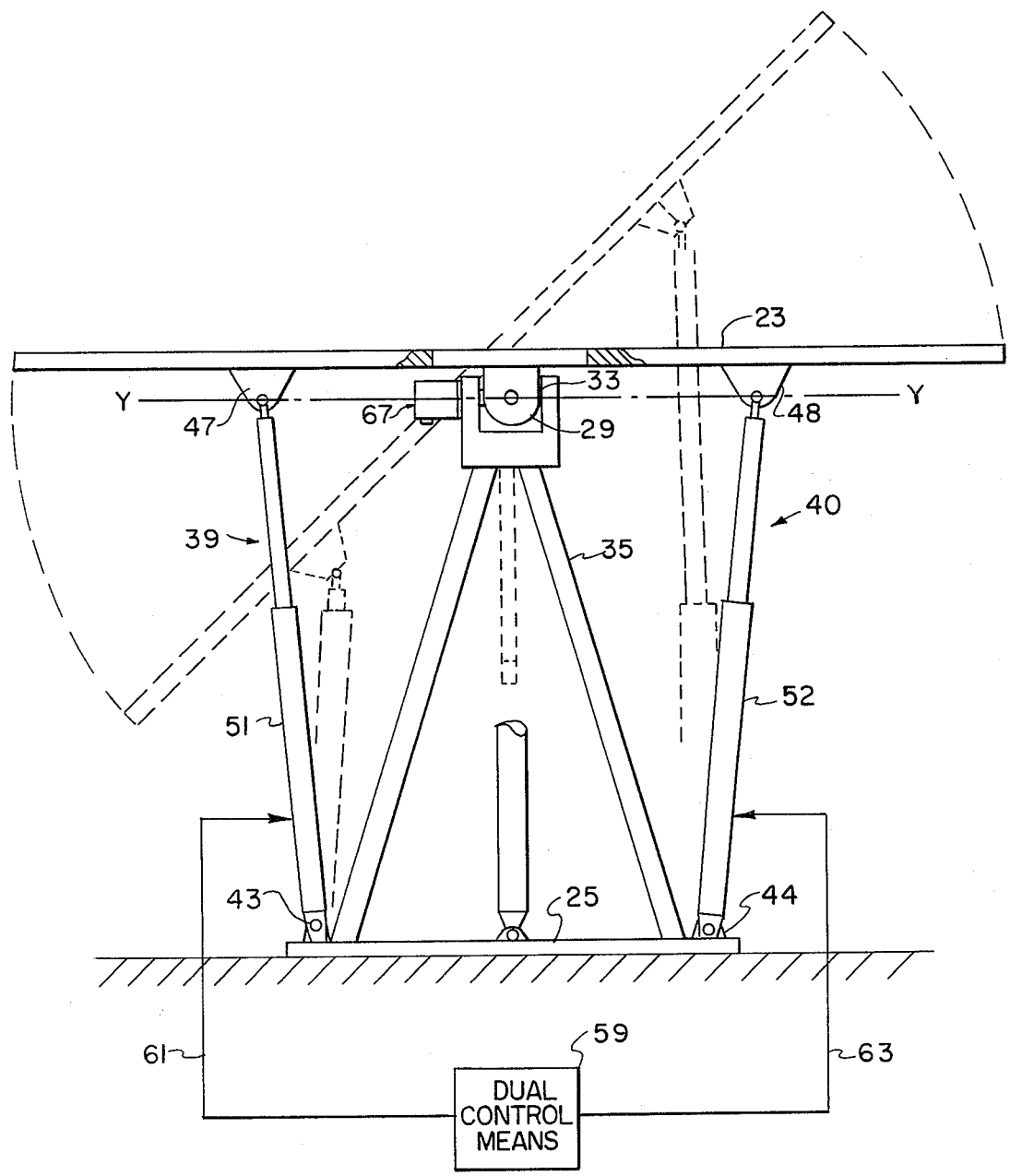

Referring to FIGS. 2 and 3 of the accompanying drawing, a mounting plane 23 (for mounting a device such as a microwave antenna, an optical mirror, or a polarized flat reflector) is rotatably mounted to a base plane 25 (which might represent either the ground or deck of a ship) about a first axis defined by a gimbal 27 which engages depending brackets 29 and 31 on the mounting plane, and about a second axis defined by a transverse pin 33 fitted to the gimbal and engaging an upstanding bearing 35 secured to the base plane.

Control of tilting movement of the mounting plane 23 about the first axis (identified as the X axis) and the second axis (identified as the Y axis) is exercised by four support arm members 37-40, each of which includes an upstanding bracket 41-44 affixed to the base plane 25 at the corners of a rhombus so as to define four suspension points lying in the base plane at the corners of the rhombus, and a further depending bracket 45-48 affixed to geometrically opposite suspension points lying in the mounting plane. Each of the support arm members 37-40 includes an intermediate drive member 49-52 which is affixed to the upstanding bracket 41-44 through a hinge or spherical joint, (hinge joints for 41, 42; spherical joints for 43, 44) and to the depending bracket 45-48 through a spherical joint. The intermediate drive members 49-52 are comprised of linear actuators. The term "linear actuator" as used herein refers to any arm-like device capable of being lengthened or foreshortened along its longitudinal axis. Suitable linear actuators include conventional pistons in cylinders, jack screws, rack and pinion assemblies, etc. The X axis passes through the depending brackets associated with one pair of diagonally opposite support arm members, the Y axis passes through the depending brackets associated with the other pair of diagonally opposite support arm members when the base and mounting planes are parallel, and the longitudinal axis of the bearing passes through the intersection of the X and Y axes.

FIG. 2 functionally represents a dual control means 53 selectively applying power through lines 55 and 57 to the first pair of diagonally opposite support arm members 37, 38. A second dual control means 59, shown in FIG. 3, might selectively apply power through lines 61 and 63 to the other pair of diagonally opposite support arm members 39, 40. Although not specifically illustrated or described herein, it is contemplated that numerous electromechanical and electrohydraulic or pneumatic control systems, well within the state of the art, can be used to control the linear actuators in a dual fashion as described herein.

Angular motion transducers 65 and 67 may be provided for each of the X and Y axis. These provide position information for their respective axis. They may comprise, for example, digital encoders or synchros, and may be directly coupled, as shown in FIGS. 2 and 3, to the gimbal 27 and to the transverse pin 33, or they may be offset by means of gears, timing belts or other standard parts.

The basic operation of the invention involves simultaneously increasing the length of one of the linear actuators in a diagonally opposite pair while diminishing the length of the other linear actuator in the diagonally opposite pair.

The configuration of FIGS. 2 and 3 illustrates the base and mounting planes in zenith position, i.e., the suspension points which lie in and define the respective base and mounting planes define support arm member axes such that the planes are parallel. The system described above will permit a tilt of the mounting plane with respect to the base plane about the X and Y axis which pass through the depending brackets associated with pairs of diagonally opposite support arm members.

Now considering that the control means 53 through lines 55 and 57 drives the associated diagonally opposite pair of support arm members 37, 38 linearly so as to foreshorten one to the extent that it lengthens the other, the mounting plane will pivot with respect to the base plane about the Y axis. Similarly, control means 59 through lines 61 and 63 may drive the associated support arm members 39, 40 linearly to rotate the mounting plane with respect to the base plane about the X axis. These two actions may be effected separately or simultaneously, and this basic action defines the general pointing geometry of the invention.

In the disclosed embodiment, the useful angle of rotation is approximately ±60° about each axis. However, when the positioning apparatus is used with a flat plate reflector in a Flat Plate Cassegrain System, where an optical doubling of the mechanical angle occurs, it is possible to obtain coverage of a complete hemisphere or more.

Therefore, it is apparent that a high-agility positioning apparatus has been disclosed wherein the drive system need drive only the antenna or other mounted device (including its own back-up structure), and the antenna back-up structure does not have to transmit torque from a shaft or gear. The gimbal 27 need only support the environmental loads and a small fraction of the drive forces. The base structure can be simple and light since it has only to support the bearing 35, and it does not have to carry drive system reaction forces or weight.

Obviously, numerous modifications and variations of the present invention are possible in light of the above teachings. For example, pin 33 may be supported by a suitable linkage in place of bearing 35. It is therefore to be understood that within the scope of the appended claims, the invention may be practiced otherwise than as specifically described herein.

What is claimed as new and desired to be secured by Letters Patent of the United States is:

1. Apparatus for mounting a device defining a mounting plane so as to be selectively rotatable about mutually perpendicular axes with respect to a base defining a base plane and so as to be capable of being pointed with extreme accuracy and moved with high velocity or rapid acceleration, comprising:

four suspension points lying in and defining each of the base and mounting planes, the suspension points in each of the planes arranged in like geometric symmetry and defining rhombi lying in each of the planes;

four support-arm members joining the base and mounting planes and terminated at opposed pairs of suspension points in the planes, each support-arm member including a linear actuator and having first and second joints at its respective ends;

a gimbal having a longitudinal rotation axis;

means for rotatably mounting the gimbal to the mounting plane such that the longitudinal rotation axis of the gimbal passes through the first joints associated with one pair of diagonally opposite support-arm members;

a pin fitted transversely to the gimbal and having a longitudinal rotation axis; and means for rotatably mounting the pin to the base lane such that the longitudinal rotation axis of the pin passes through the first joints associated with the other pair of digonally opposite support-arm members when the base and mounting planes are parallel.

2. The apparatus recited in claim 1 including:

control means for simultaneously increasing the length of one of the linear actuators in a diagonally opposite pair of support-arm members while diminishing the length of the other linear actuator.

3. The apparatus recited in claim 1 wherein the gimbal-mounting means includes:

a pair of depending brackets on the mounting plane engaging the gimbal.

4. The apparatus recited in claim 1 wherein the pin-mounting means includes:

an upstanding bearing secured to the base plane and engaging the pin.

5. The apparatus recited in claim 1 wherein the linear actuator includes:

a cylinder; and a piston in the cylinder.

6. The apparatus recited in claim 2 wherein the control means includes:

an electrohydraulic control system.

7. The apparatus recited in claim 1 including:

an angular motion transducer coupled to the gimbal.

8. The apparatus recited in claim 1 including:

an angular motion transducer coupled to the pin.

* * * * *